(12) United States Patent
Bauer et al.

(10) Patent No.: US 6,196,183 B1
(45) Date of Patent: Mar. 6, 2001

(54) METHOD FOR CHANGING THE OPERATING MODE OF A DIRECT-INJECTION OTTO CYCLE INTERNAL-COMBUSTION ENGINE (75) Inventors: Bernd Bauer, Esslingen; Andreas Hertzberg, Stuttgart; Charles Robert Koch, Pattonville/Reseck; Andreas Biemelt, Schwaikheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/325,653

(22) Filed: Jun. 4, 1999

(30) Foreign Application Priority Data

Jun. 4, 1998 (DE) .............................................. 198 24 915

(51) Int. Cl.$^7$ ..................................................... F02B 17/00
(52) U.S. Cl. ........................................... 123/295; 123/305
(58) Field of Search .................................... 123/295, 305; 60/277

(56) References Cited

U.S. PATENT DOCUMENTS

| 5,078,107 | | 1/1992 | Morikawa . | |
| 5,875,756 | * | 3/1999 | Kamura et al. | 123/295 |
| 6,006,717 | * | 12/1999 | Suzuki et al. | 123/295 |
| 6,058,904 | * | 5/2000 | Kruse | 123/295 |
| 6,058,906 | * | 5/2000 | Yoshino | 123/295 |
| 6,062,190 | * | 5/2000 | Nakajima | 123/295 |

FOREIGN PATENT DOCUMENTS

| 43 15 278 A1 | 11/1994 | (DE) . |
| 195 43 219 C1 | 11/1995 | (DE) . |
| 197 37 375 | 3/1998 | (DE) . |
| 0 831 227 | 8/1998 | (EP) . |
| 0 879 955 | 11/1998 | (EP) . |
| 2 319 096 | 5/1998 | (GB) . |

* cited by examiner

Primary Examiner—John Kwon
(74) Attorney, Agent, or Firm—Evenson, McKeown, Edwards & Lenahan, P.L.L.C.

(57) ABSTRACT

A direct-injection Otto cycle internal-combustion engines can be operated in the stratified charge mode with a later fuel injection during the compression cycle and a lean mixture formation and, with an operating mode with a homogeneous mixture formation, by fuel injection during the intake cycle which is provided for higher load ranges of the internal-combustion engine. The exhaust gases of the internal-combustion engine are decontaminated by an $NO_x$ storage catalyst which must be periodically regenerated during a homogeneous mixture formation and at rich fuel/air ratios ($\lambda$). To permit a fast change of the operating mode and particularly the regeneration of the storage catalyst without changing the running performance of the internal-combustion engine, the fuel quantity to be injected per power cycle, is apportioned during a homogeneous operating phase during the change of operating modes, corresponding to the actual intake air flow rate by adjusting the respective injection time. Isochronously and proportionally to the change of the injection time, the ignition point in time is adjusted in the direction of a late ignition. The homogeneous operating phase is limited by a change-over point in time at which the injection end of the fuel injection is shifted into the power cycle provided for the demanded operating mode.

14 Claims, 5 Drawing Sheets

METHOD FOR CHANGING THE OPERATING MODE OF A DIRECT-INJECTION OTTO CYCLE INTERNAL-COMBUSTION ENGINE

BACKGROUND OF THE INVENTION

This application claims the priority of 198 24 915.2, filed Jun. 4, 1998, the disclosure of which is expressly incorporated by reference herein.

The present invention relates to a method for changing the operating mode of a direct-injection Otto-cycle internal-combustion engine between a stratified charge operation with fuel injection during the compression stroke and a lean mixture formation and an operating mode with a homogeneous mixture formation by fuel injection during the intake stroke of the internal-combustion engine.

More particularly, the present invention relates to an operating mode changing method with lean fuel/air mixture being formed with fuel/air ratios $\lambda>1$, and an operating mode with a homogeneous mixture formation provided for higher load ranges of the internal-combustion engine by fuel injection during the intake cycle, comprising the steps of operating the internal-combustion engine, for periodic regeneration of an $N_{ox}$ storage catalyst for decontaminating exhaust gases of the internal-combustion engine flowing through at lean fuel/air ratios ($\lambda$), with the homogeneous mixture formation and rich fuel/air ratios ($\lambda$) below the stoichiometric mixture ratio $\lambda=1$.

In a direct-injection Otto cycle internal-combustion engine, the combustion can in principle take place in two different operating modes. The difference is basically the quality of the fuel/air mixture formed in the combustion space. In the operating mode with a homogeneous mixture formation, in every operating cycle, an intake air flow assigned to the respectively present load point of the internal-combustion engine is admitted into the combustion space, and intake air flow can be adjusted by a corresponding throttling of the intake air flow rate.

During the intake stroke in such an operating mode, the fuel is injected directly into the injection space and the intake air existing therein. In the remaining time period to the ignition at the end of the compression stroke, a homogeneous mixture is formed with fuel-air ratios in the ignitable range, that is, approximately $\lambda=1$. The lambda fuel-air ratio normally indicates the ratio of the fuel quantity to the air quantity of the combustion space charge.

With such a homogeneous mixture formation, the entire combustion space is therefore filled with the ignitable mixture so that it is always ensured that the ignition of the combustion space charge can take place at the electrodes of a spark plug. A quantity control therefore takes place of the load of the internal-combustion engine by way of the throttling of the intake air flow rate and the adjustment of the intake air flow apportioned per operating cycle to a cylinder for the mixture formation.

In the stratified charge operation, the intake air is guided in an unthrottled manner; i.e., the maximally conventional air quantity is taken in. The fuel injection takes place during the compression stroke and therefore at a late point in time in the operating cycle shortly before the ignition. A non-homogeneous stratified fuel/air mixture with locally different fuel/air ratios is formed in the combustion space. That is, a fuel-rich mixture cloud is present close to the injector which can be ignited by the ignition spark. The fuel-rich mixture cloud is surrounded with regions of a high air excess.

In the stratified charge operation, a quality control of the operating load of the internal-combustion takes place by the adjustment of the injection quantity from which locally present ignitable mixture is formed. Relative to the total volume, in the stratified charge operation, a combustion space charge with fuel/air ratios $\lambda>1$ is formed, whereby, in the stratified charge operation, advantages can be achieved with respect to the fuel consumption of over 20% in comparison to the homogeneous mixture formation with $\lambda=1$ with the same operating load.

At higher operating loads of the internal-combustion engine, however, the advantageous charge stratification can lead to an increasing deterioration of the efficiency. Furthermore, in these power ranges of the internal-combustion engine, mixture preparation problems cannot be avoided with charge stratification. The internal-combustion engine is therefore operated in the lower and medium partial load range by a charge stratification, and the operating mode with a homogeneous mixture formation is provided for the higher load ranges.

The exhaust gas of the internal-combustion engine is decontaminated by an $NO_x$ storage catalyst which, in the stratified charge operation, adsorbs the nitrogen oxides contained in the flowing-through oxygen-rich exhaust gas of the internal-combustion engine. The storage catalyst additionally functions as a three-way catalyst for the operation with a homogeneous mixture formation and stoichiometric or rich fuel/air ratios $\lambda \leq 1$ in a known manner. The storage catalyst adsorbs the nitrogen oxides emitted in the stratified charge operation and must be periodically regenerated.

For regenerating the storage catalyst, DE 43 15 278 A1 (corresponding to U.S. Pat. No. 5,628,186). suggests that a reducing agent, such as ammonia, be added to the exhaust gas. Together with the admixed reducing agent, the nitrogen oxides contained in the exhaust gas, according to the method of the selective catalytic reduction, are to be converted to environmentally friendly nitrogen and water. The known method provides that, for apportioning the reducing agent, the reducing agent rate charged into the exhaust gas be adjusted as a function of operation-relevant parameters of the exhaust gas, of the catalyst and optionally of the engine. The known method is, however, not suitable for regenerating a storage catalyst for an internal-combustion engine for driving vehicles because it is absolutely necessary to carry along a reducing agent supply in the vehicle.

DE 195 43 219 C1 (corresponding to U.S. Pat. No. 5,771,686) describes a method for driving a diesel engine which uses additional fuel as the reducing agent for the desorption of the storage catalyst. For regenerating the storage catalyst, the internal-combustion engine is therefore operated with a rich mixture (fuel/air ratio $\lambda<1$) below the stoichiometric mixture ratio $\lambda=1$. The known method provides a rich/lean control of the diesel engine as a function of its operating parameters load, rotational speed and injection quantity. The regeneration of the $NO_x$ storage catalyst is to be implemented not only by a simple lambda jump, but additional measures are suggested which are adapted to the diesel engine in order to achieve the after-engine nitrogen oxide reduction of the diesel engine.

The indicated measures are an exhaust gas recirculation optimized with respect to the exhaust gas aftertreatment system, an adapted intake air throttling and an additional injection of fuel. These measures are intended to make available, on one hand, sufficient reducing agent in the form of hydrocarbons for the $NO_x$ reduction, and, on the other hand, to generate in the exhaust gas for a short time an atmosphere which has a reducing effect to permit the regeneration process. The nitrogen oxide content of the exhaust gas is sensed by an $NO_x$ sensor such that, when an $NO_x$ storage threshold value, which varies with respect to the characteristic diagram as a function of the rotational speed and the load, is reached, a change-over takes place from an operation of the diesel engine with a lambda value >1 to an operation with a lambda value <1. If, when the $NO_x$ threshold value is reached, the $NO_x$ sensor switches to the regeneration operation, in the known method, the exhaust gas composition is to be changed. In addition to the measures for the exhaust gas recirculation, the intake air throttling and the additional afterinjection of diesel fuel are to take place by the optimization of the exhaust gas composition by measuring the soot particles as well as by a control of the regeneration temperature of the storage catalyst.

The known automatic engine control measures are specifically adapted to the operating performance and the requirements of the diesel internal-combustion engine. Furthermore, DE 195 43 219 C1 contains no information as to in which manner the mutually influencing control measures and operating parameters of the internal-combustion engine are to be coordinated when the operating mode is changed. Although the known method indicates a possibility as to how the regeneration conditions of the $NO_x$ storage catalyst can be produced within the scope of the lean/rich control of the diesel engine, it does not address the specific requirements of the mixture preparation when changing the operating mode (stratified charge/homogeneous mixture formation) of a direct-injection Otto cycle internal-combustion engine.

SUMMARY OF THE INVENTION

An object of the present invention is to provide a method which permits, in a direct-injection Otto cycle internal-combustion engine, a fast change of the operating mode, particularly for the regeneration of an $NO_x$ storage catalyst for the decontamination of the engine exhaust gases without changing the running performance of the internal-combustion engine.

According to the invention, this object has been achieved by a method in which at a change-over point in time ($T_u$), the injection end (T) of the fuel injection is shifted into the power cycle provided for the demanded operating mode, and, during a homogeneous operating phase bounded by the change-over point in time ($T_u$), the fuel quantity to be injected per power cycle is apportioned corresponding to the actual intake air flow by adjusting the respective injection time (t) and in that, isochronously and proportionally with the change of the injection time (t), the ignition point in time (ZZ) of the mixture ignition is adjusted with the increasing injection time (t) in the direction of a later ignition.

During the change of the operating mode, the transition between the different methods of mixture formation in the stratified charge operation and with a homogeneous mixture formation are harmonized in the method of the present invention. The actual change of operating modes takes place suddenly at a change-over point in time by shifting the injection end of the fuel injection into the power cycle provided for the demanded operating mode. Accordingly, during a change from the stratified charge operation to a homogeneous mixture formation, the fuel quantity to be injected is injected before the change-over point in time corresponding to the stratified charge principle, during the compression stroke.

Starting from the change-over point in time, the injection end of the fuel injection is in the intake stroke, i.e., before the lower dead center is reached in the crank circle of the considered cylinder of the Otto cycle internal-combustion engine. During the homogeneous operating phase bounded by the change-over point in time, the fuel quantity to be injected per power cycle is apportioned corresponding to the actual intake air flow. The required fuel quantity is adjusted by adjusting the respective injection time, i.e., the duration of the fuel injection.

The change of operating modes takes place suddenly because the injection time and therefore the fuel injection quantity can virtually be changed without delay. However, delays take place in the buildup of the required intake air flow rate of the demanded operating mode.

For the periodic regeneration of the $NO_x$ storage catalyst, during the stratified charge operation with an unthrottled intake air flow, the fuel quantity to be injected per power cycle is increased for the duration of the desorption such that, by way of the intake air flow present in the combustion space, homogeneous mixture is produced with the fuel/air ratio lambda required for the desorption. The regeneration of the storage catalyst can therefore take place without any throttling of the intake air flow, so that the lambda mixture ratio required for the regeneration is produced only by the increase of the injection time. After the regeneration has occurred, a change-over takes place back into the stratified charge operation. The injection time for the stratified charge operation is adjusted corresponding to the existing operating load of the internal-combustion engine.

During the change-over of the operating mode from the stratified charge operation to the operating mode with a homogeneous mixture formation, the injection quantity is increased while the operating load is the same and the actual intake air flow for a more or less short time period does not correspond to the demanded operating mode. This has no effect on the running performance of the internal-combustion engine, for example, as the result of a short-term power increase, because the adjustment of the ignition point in time according to the invention permits control of the engine torque and thus compensation of the power output of the internal-combustion engine.

The ignition point in time of the mixture ignition is adjusted isochronously and proportionally with the change of the injection time, specifically with an increasing injection time in the direction of a late ignition, whereby the torque delivered by the internal-combustion engine is kept constant. With a later mixture ignition, which is triggered shortly before the reaching of the ignition dead center or even optionally after it in the crank circle, the mixture combustion and the energy conversion takes place late in the expansion stroke and thus with a comparatively poor efficiency. As the result of the suitable selection of the ignition point in time, the fuel injection quantity which is changed during the change of operating modes and which may be too high can be neutralized. Thereby, the torque is no larger than in the steady-stage operation of the respective operating mode with an optimal injection quantity and a correspondingly optimized ignition point in time.

The short-time excess of the fuel injection quantity in the stratified charge operation for producing a correspondingly short-time homogeneous mixture formation is particularly suitable for the regeneration of the storage catalyst if, after the desorption has taken place, the internal-combustion engine is to be operated continuously with a charge stratification in the partial load range. The shifting of the injection end of the fuel injection, the change of the injection time and of the ignition point in time takes place simultaneously and momentarily at the change-over point in time so that the regeneration of the storage catalyst can take place without delay and, because of the adjustment of the ignition point in time, without any influence on the running performance of the internal-combustion engine. The ignition point in time is expediently determined according to a defined dependence on the power of the internal-combustion engine to be delivered and on the actual injection quantity.

If a load-caused change is to take place to a homogeneous mixture formation or, after the regeneration of the storage catalyst, the internal-combustion engine is to continue to run in the operating mode with the homogeneous mixture formation, an advantageous further development of the invention provides that a throttling element acting upon the intake air flow be adjusted before the change-over point in time in the direction of a minimal flow rate. In this development, a slight throttling of the intake air flow and a slight increase of the injection quantity, i.e., of the injection time first takes place, whereby this operation can easily be controlled until the change-over which takes place soon afterwards.

Starting from the change-over to the homogeneous operation, the injection time is defined by the cylinder charge and the desired homogeneous fuel/air ratio lambda. This results in an injection time which is long for a short time, corresponding to a large intake air quantity which decreases subsequently corresponding to the throttling operation and finally reaches the steady-state value. The adjustment of the ignition point in time takes place isochronously and proportionally to the change of the injection time so that the torque of the internal-combustion engine remains constant during the transition time of the throttling operation.

In the homogeneous operation, a later point in time of the ignition is selected which, during the transition phase of the not yet concluded throttling of the intake air flow, is very late in order to neutralize the injection quantity which was increased to an excess for a short time. During a change from the operating mode with the homogeneous mixture formation to the stratified charge operation, the throttling element is analogously adjusted into the opening position, the adjustment of the throttling element also in this case taking place before the change-over point in time. During the remaining time from the adjustment of the throttling element to the change-over point in time, already starting from the steady-state, that is, throttled intake air flow, the suction pipe of the internal-combustion engine is filled rapidly.

A throttle valve in the suction pipe of the internal-combustion engine is suggested as the throttling element which, during a change to the homogeneous mixture formation, before the change-over point in time, is brought into the closing position with a minimal flow rate so that the gas mass in the cylinder will decrease rapidly in the power cycles of the internal-combustion engine which follow. At the end of the throttling phase during the change of the operating mode to a homogeneous mixture formation, the throttle valve is moved from the closing position into a position which corresponds to the demanded steadstate condition. In this latter position, the intake air flow is throttled to the amount required for the homogeneous mixture formation. The change of the throttle valve into the steady-state position at the end of the throttling phase can be coupled to a threshold value of the deviation of the present cylinder filling from the steady-state value. This threshold value may, for example, be 5%.

The harmonizing of the change of the operating mode and thus the uniform running performance during and after the change of the operating mode can be improved if the closing movement of the throttling element takes place in two steps. After a first partial step, the throttling element is held for a short time in the intermediate position, whereby the injection time can be adjusted corresponding to the intake air quantity and likewise the ignition point can be optimally compensated.

Advantageously, the throttling of the intake air flow takes place by a variably adjustable valve timing gear of the charge cycle valves of the internal-combustion engine, whereby, for example, the valve stroke or the valve timing can be variably adjusted. Such a variable valve timing offers the possibility of changing the cylinder charge abruptly from one power cycle to the next, whereby the change of the operating mode is also accelerated considerably.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
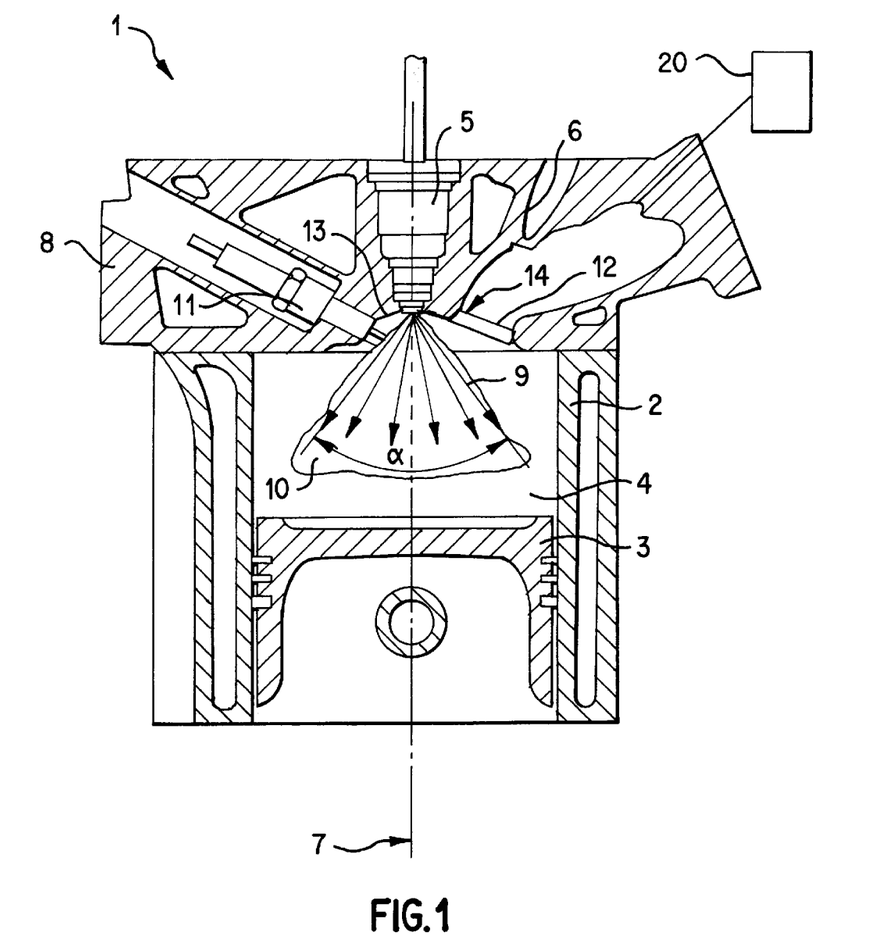
FIG. 1 is a longitudinal sectional view of the cylinder of a direct-injection Otto cycle internal-combustion engine.

FIG. 1 is a longitudinal sectional view of a cylinder 2 of a direct-injection Otto internal-combustion engine 1 which may have only one cylinder 2 or an arbitrary number of identical cylinders 2. A piston 3 is longitudinally displaceably arranged in the cylinder 2 and bounds a combustion space 4 in the cylinder 2. The cylinder 2, and thus the combustion space 4, are closed by a cylinder head 8. In the central position on a longitudinal axis 7 of the cylinder 2, an injector 5 penetrates the cylinder head 8 and has an injector nozzle 6 projecting into the combustion space 4. The combustion space roof 13 of the cylinder head 8, i.e., the side of the cylinder head 8 facing the combustion space 4 has a conically expanded construction in the central position. In the illustrated embodiment, the injector nozzle 6 is configured as a conical jet nozzle so that, during each injection, the fuel is injected into the combustion space 4 in the form of a conical jet 9 with the opening angle $\alpha$ with respect to the piston 3.

For the mixture formation with the injected fuel, fresh air can be supplied to the combustion space 4 through an inlet port 12 in the cylinder head 8. In the mouth of the inlet port 12 into the combustion space 4, a valve seat 14 is arranged in the combustion space roof 13 for an inlet charge cycle valve. The charge cycle valve itself (not shown) controls the fresh air supply into the combustion space by lifting off the valve seat 14. The cylinder head also has one or, in the case of four-valve engines, two exhaust ports for the removal of exhaust gas from the combustion space 4 in a known manner, which, for reasons of clarity, need not be shown here. The timing of the exhaust gas removal from the combustion space 4 through the exhaust port is controlled like the fresh air supply by a charge cycle valve. In the cylinder head, a spark plug 11 has electrodes which project into the combustion space 4 and, by triggering an ignition spark, cause the ignition of the combustion space charge.

The direct-injection Otto cycle internal-combustion engine 1 can basically be operated in two different operating modes, specifically in the stratified charge operation or with a homogeneous mixture formation. With homogeneous mixture formation, the fuel is injected into the combustion space 4 during the intake stroke of the internal-combustion engine and is distributed in the inflowing combustion air. The intake air quantity is apportioned as a function of the operating load of the internal-combustion engine 1; i.e., the intake air flow through the intake port 12 is adjusted by a throttling element 20. In the remaining time to the ignition at the end of the compression stroke, the fuel is uniformly distributed in the entire combustion space 4 and a homogeneous fuel/air mixture is formed.

In homogeneous mixture formation, the operating load of the internal-combustion engine is controlled by way of the adjustment, i.e., the throttling of the intake air flow (quantity control). The fuel/air ratios lambda ($\lambda$) of the mixture, i.e., the ratio between the injected fuel and the intake air quantity is within a lambda window in the range of the stoichiometric composition $\lambda=1$. A homogeneous operation of the internal-combustion engine is possible approximately within the range $\lambda=0.7$ to $\lambda=1.4$.

In stratified charge operation, the fuel is injected during the compression stroke of the internal-combustion engine, in which a lean fuel/air mixture is formed with the intake air fed in an unthrottled manner, which mixture has fuel/air ratios $\lambda>1$. The maximally possible air quantity is always taken in and, during the late fuel injection, partial volumes are created in the combustion space which have sectorially different fuel/air ratios. The fuel of the centrally arranged injector 5, corresponding to the conical fuel jet 9 forms a central mixture cloud 10 in the combustion space which has a high fuel concentration and which is surrounded by volume areas with a high air excess. The operating load of the internal-combustion engine is controlled by variation of the injection quantity (quality control). This operating mode with a homogeneous mixture formation is provided for higher load ranges of the internal-combustion engine.

A control unit or automatic controller unit (not shown) determines specifically for each operating point of the internal-combustion engine 1 the point in time of the opening-up of the nozzle opening 6, as of which fuel is injected into the combustion space, as well as the closing point in time of the injector 5. By way of the suitable selection of the control points in time of the injector 5, the duration of the fuel injection, the fuel injection quantity as well as the injection angle $\alpha$ of the conical jet 9 can be varied.

The control unit assigns the control times of the injector to the momentary position of the piston 3 in the cylinder 2. The end of the fuel injection during the homogeneous operation in the intake cycle occurs before reaching lower dead center of the piston movement in the crank circle. The control unit also determines the ignition point in time corresponding to the present operating load and operating mode of the internal-combustion engine 1 as well as furthermore the adjustment of a throttling element for influencing the intake air flow rate.

Within wide characteristic diagram ranges, the Otto cycle internal-combustion engine 1 is operated by exhaust gas recirculation. The quantity of the recirculated exhaust gas, i.e., the exhaust gas recirculation rate, is controlled by the control unit in coordination with the other mixture formation parameters by the adjustment of a corresponding control element. The control element can, for example, form a throttle valve in an exhaust gas recirculation pipe for the exterior exhaust gas recirculation. The internal exhaust gas recirculation during a load change by controlling the timing of the charge cycle valves can, however, also be taken into account and can be influenced within a permissible scope by variation of the control times. For influencing the internal exhaust recirculation, the throttling element of the intake air flow can be used. The throttling element therefore advantageously forms a variable valve timing gear of the charge cycle valves with variably adjustable opening times and a variably adjustable opening lift.

The exhaust gases of the Otto cycle internal-combustion engine are guided through an $NO_x$ storage catalyst and decontaminated. The storage catalyst contains the function of a three-way catalyst which, in the case of a homogeneous mixture formation at $\lambda \leq 1$, in a proven manner, reduces the exhaust gas emission of the internal-combustion engine and subjects the various harmful-substance constituents of the stoichiometrically composed exhaust gas to a selective catalytic reaction. The nitrogen oxides which occur in the oxygen-rich exhaust gas at lean fuel/air ratios lambda in the stratified charge operation are absorbed in this operating mode in the $NO_x$ storage catalyst.

For the periodic regeneration of the storage catalyst, a change takes place to an operation of the internal-combustion engine with rich fuel/air ratios lambda below the stoichiometric mixture ratio $\lambda=1$, for example, $\lambda=0.8$ or $\lambda=0.9$. In homogeneous mixture formation with rich fuel/air ratios, the stored nitrogen oxides are desorbed and are then reduced by additional pollutants present, such a carbon monoxide or unburnt hydrocarbons, as the reducing agents.

A change of the operating mode between a stratified charge operation and the operating mode with a homogeneous mixture formation takes place, on one hand, when a defined load threshold which separates the corresponding operating ranges with the respective operating mode in the characteristic diagram of the internal-combustion engine is either exceeded or not reached. In the stratified charge operation, the regeneration of the storage catalyst must take place periodically, and the operating mode must be changed for that purpose.

In the following discussion, several embodiments of the method for changing the operating mode according to the present invention will be described in detail, in which FIGS. 2 to 5 show the time sequences of the characteristic mixture formation and combustion parameters. For facilitating an understanding, the diagrams of the respective parameters are indicated in the same sequence in each of those drawing figures. On the left top of the respective first diagram, the time variation is shown of the desired value for the position angle of a throttle valve in the intake port of the internal-combustion engine. The left column below it shows the course of the mixture mass m in the combustion space in milligrams per power cycle (mg/Asp); the injection end T of the fuel injection in ° KW before the reaching of the upper dead center in the fourth cycle (ZOT), and the desired value for the valve stroke of an exhaust gas recirculation valve AGR in millimeters. The respective right column of the drawing figures shows in the downward direction diagrams of the time sequence of the lambda fuel/air ratio, of the injection time t in milliseconds as well as of the ignition point in time ZZ in °KW before ZOT.

Figure 2:
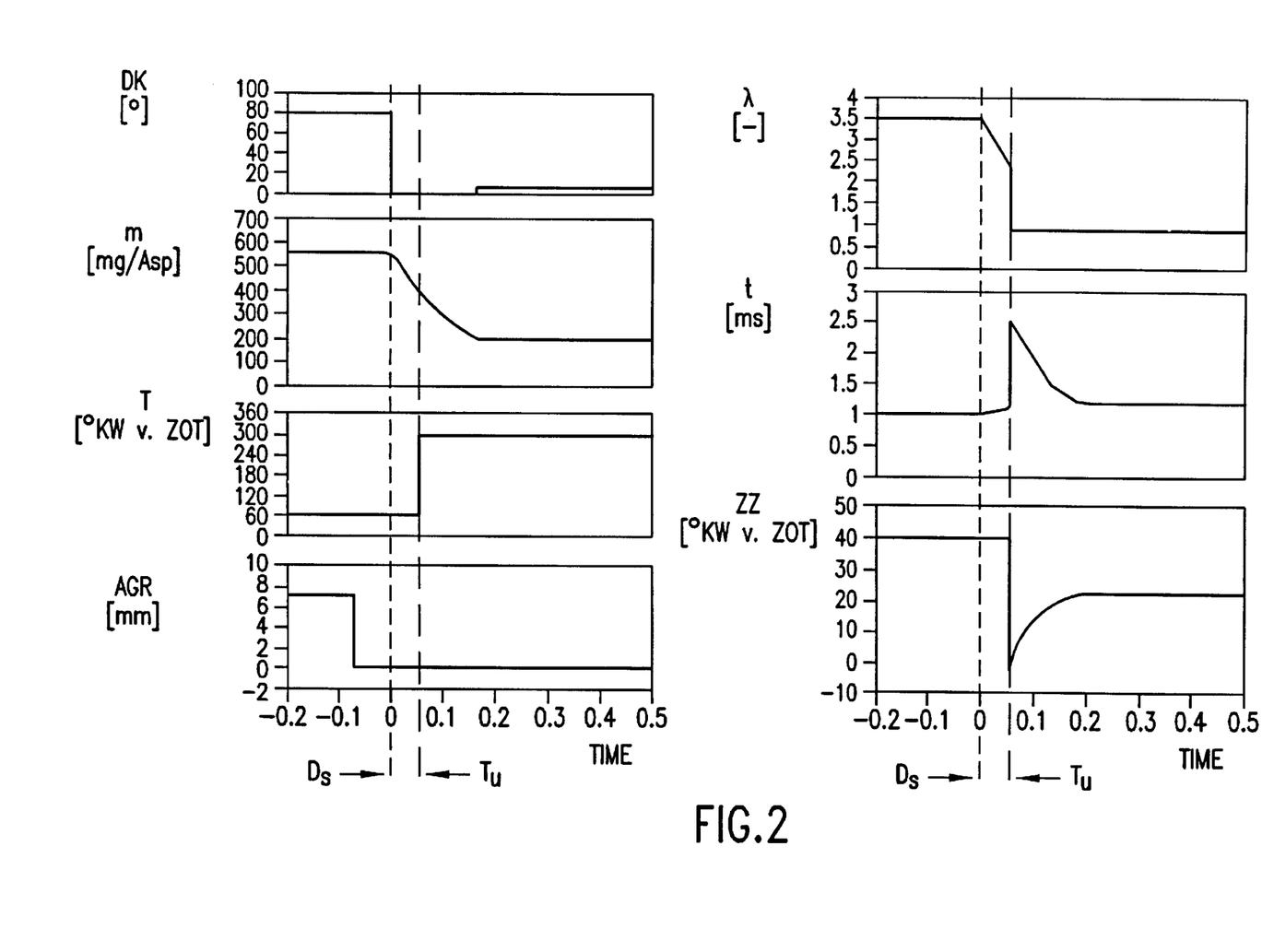
FIG. 2 are diagrams of the time sequence of relevant engine parameters during the change of the operating mode from the stratified charge operation to the homogeneous mixture formation.

FIG. 2 shows the parameter courses in the case of a change of the operating mode from the stratified charge operation with $\lambda=3.5$ to the homogeneous operating mode with $\lambda=0.8$ for the regeneration of the storage catalyst. As mentioned above, the point in time of the fuel injection is shifted from the compression stroke into the intake cycle; as illustrated in the diagram of the course of the injection end, the injection end T is advanced from an injection angle of 60° KW before ZOT by 240° to 300° KW before ZOT into the intake stroke of the piston. The change of the injection end T takes place suddenly at the change-over point in time $T_u$, which therefore separates the operating phase with the charge stratification shown on the left in the diagrams from the homogeneous operating phase starting on the right of the broken change-over line.

During the homogeneous operating phase, the fuel quantity to be injected per power cycle is apportioned corresponding to the actual intake air flow by adjusting the respective injection time t. In the case of a homogeneous mixture formation, while the operating load is the same as in the stratified charge operation, a larger injection quantity is required so that, at the change-over point in time $T_u$, the injection time t—as illustrated in the corresponding diagram—is increased abruptly in order to permit the formation of an ignitable homogeneous mixture with the present intake air flow rate.

For the change of the operating mode to the homogeneous mixture formation, a throttle valve acting upon the intake air flow is adjusted in the direction of a minimal flow rate. After the closing of the throttle valve, the suction pipe, which is completely filled with air in the stratified charge operation, is first emptied as rapidly as possible before the steady-state cylinder filling m is achieved. The time duration for the reduction of the combustion space mass m is mainly a function of the rotational speed because the number of power plays is decisive for the time sequence of the mixture mass.

The adjustment of the throttle valve takes place during the change of the operating mode to the homogeneous mixture formation as well as also during the change to the stratified charge operation before the change-over point in time $T_u$. The distance of the closing point in time $D_S$ of the throttle valve from the change-over point in time $T_u$ is determined by the control unit. In order to achieve an evacuation of the suction pipe which is as fast as possible, the throttle valve is first changed into the completely closed position. only at the end of a transition phase of the mixture forming parameters during the operating mode change, is the throttle valve moved into the provided steady-state position for the catalyst regeneration and into the steady-state position corresponding to the demanded operating load in the case of the homogeneous mixture formation.

Before the change of the operating mode at the change-over point in time $T_u$, the intake air flow is therefore already slightly throttled, thereby reducing the mixture mass m per power cycle and correspondingly reducing the lambda fuel/air ratio. The time course of the injection time, i.e., of the actually injected fuel quantity, rises at the change-over point in time $T_u$ first to a very high value in order to form a homogeneous mixture with the still existing large air quantity per power cycle. The injection time t is reduced proportionally to the time-related decrease of the cylinder charge to the steady-state condition.

According to the invention, isochronously and proportionally to the change of the injection time t, the ignition point in time ZZ of the mixture ignition is adjusted, whereby a constant torque is ensured during the transition phase. During the change to the homogeneous mixture formation, that is, an increasing injection time, the ignition point in time is adjusted in the direction of a later ignition. The ignition point in time is defined by the control unit according to a defined dependence on the power of the internal-combustion engine to be delivered and the actual injection quantity.

At the change-over point in time $T_u$, the ignition point in time ZZ is shifted by more than 40° KW in the direction of the upper dead center. The mixture ignition even takes place behind the upper ignition dead center so that the mixture combustion does not take place until far into the expansion phase. The injection quantity which, during the change of the operating mode to the homogeneous mixture formation, is increased far above the actual power requirement, is neutralized by the late combustion with a poor efficiency. By way of the course of the ignition point in time which is proportional to the injection time, the power output of the internal-combustion engine is kept constant during the non-steady state operation during the change of the operating mode, whereby no changes of the running performance of the internal-combustion engine can occur in this operating phase.

The change of the operating mode can be further harmonized if the closing movement of the throttle valve takes place in two steps.

In a variation of the above-described method, the change-over point in time $T_u$ is in the intermediate phase between the two closing steps of the throttle valve. Also in this variation, the throttle valve can first be moved completely into the closed position in order to accelerate the evacuation of the suction pipe by reducing the afterflowing intake air quantity. Only when the desired steady-state suction pipe pressure is reached, the throttle valve will be opened up again and be brought into the position corresponding to the desired steady-state condition.

Figure 3:
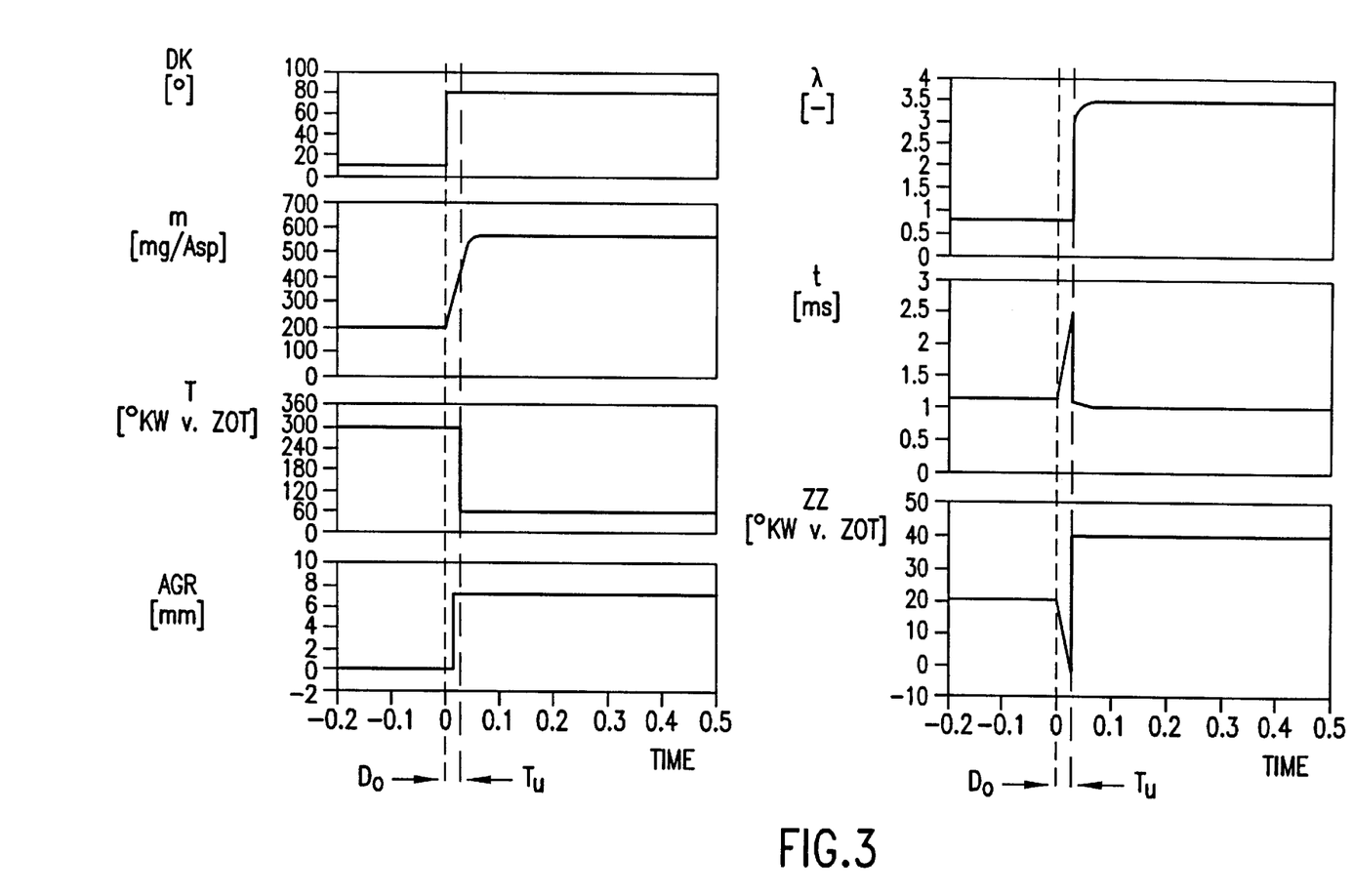
FIG. 3 are diagrams of the time sequence of the engine parameters during a change to the stratified charge operation using the method according to FIG. 1.

During a change of the operating mode to the charge stratification, according to FIG. 3, the intake air flow is increased analogously and the injection end T is shifted from the intake cycle into the compression stroke at approximately 50° before ZOT. Before the change-over point in time $T_u$, the throttle valve DK is moved into the position with the largest possible intake air flow rate, whereby the cylinder filling mass m rises rapidly. Corresponding to the rise of the intake air flow, the injection time t is also increased during the operating phase with the (still) homogeneous mixture formation until the change-over point in time $T_u$. Proportionally to the prolongation of the injection time t and the connected increase of the fuel injection quantity, the ignition point in time ZZ is first shifted until the change-over point in time $T_u$ in the direction of a late ignition. At the ignition point in time $T_u$, the injection time t and thus also the proportionally extending ignition point in time ZZ is adjusted by the control unit to the corresponding steady-state values for the stratified charge operation.

The method described by FIGS. 2 and 3 for the change of the operating mode with the throttling and unthrottling of the intake air flow rate is advantageously used for the regeneration of the storage catalyst if, after the desorption, the internal-combustion engine is to continue to run with the homogeneous mixture formation. The described method is particularly suitable for the change of the operating mode in the case of a falling-below or exceeding of the load-point-specific change-over threshold in the characteristic diagram of the internal-combustion engine.

A desorption of the storage catalyst advantageously takes place at every change-over from the stratified charge operation to the homogeneous mixture formation so that an uncontrolled desorption of stored nitrogen oxides during the homogeneous operation is excluded.

According to yet another embodiment of the method for changing the operating mode with the adjustment of the throttle valve, the change-over point in time $T_u$ during the change to the homogeneous operation is shifted to the end of the reduction phase of the cylinder filling mass m, whereby a strong increase of the fuel injection quantity is not required. In this embodiment, the resulting lambda course at first falls slowly to $\lambda=1$ and the steady-state desired lambda value for the homogeneous operating mode is reached abruptly. If the change-over of the fuel injection takes place between the intake cycle and the compression cycle during the reduction phase of the cylinder filling, the cylinder filling mass m during the change to the homogeneous operation is controlled corresponding to the homogeneous lean running limit of the internal-combustion engine. In this case, the closing adjustment of the throttle valve can take place in two steps and the intermediate step can start when the lean running limit is reached.

Basically, according to still another embodiment of the method, the change-over point in time is shifted isochronously with the closing of the throttle valve. In this embodiment, the cylinder filling mass m at the point in time of the change of the operating mode to the homogeneous mixture formation is still unchanged with respect to the stratified charge operation. The demanded fuel/air ratio is reached abruptly with a large injection quantity and a very late ignition point in time.

In the exhaust gas recirculation operation, the maximal AGR-rate in the homogenous operation is lower than in the stratified charge operation. Exhaust gas recirculation rates, as during the charge stratification, in the case of the homogeneous mixture formation, would lead to an unfavorable combustion or even to ignition failures. For this reason, the required change of the exhaust gas recirculation rate is also included by the control unit in the dynamic change of the operating mode. The exhaust gas recirculation rate is reduced before the change-over point in time $T_u$. The reduction of the exhaust gas recirculation rate takes place during the change to the stratified charge operation no later than at the change-over point in time $T_u$.

During a change of the operating mode to the homogeneous mixture formation with a change of the intake air flow rate by adjusting the throttle valve DK, the exhaust gas recirculation rate is first reduced before, shortly afterwards, the adjustment of the throttle valve is started. In this situation, an exhaust gas recirculation valve is closed completely.

During the operating phase with the homogeneous mixture formation for the regeneration of the storage catalyst, no exhaust gas recirculation takes place. However, the steady-state value of the exhaust gas recirculation rate provided for the homogeneous mixture formation can advantageously be adjusted immediately after the conclusion of the change of the operating mode during the adjustment of the required steady state cylinder filling.

If the homogeneous operation is to take place with an exhaust gas recirculation, the corresponding opening of the exhaust gas recirculation valve can take place simultaneously or with a defined time staggering with respect to the throttle valve.

Figure 4:
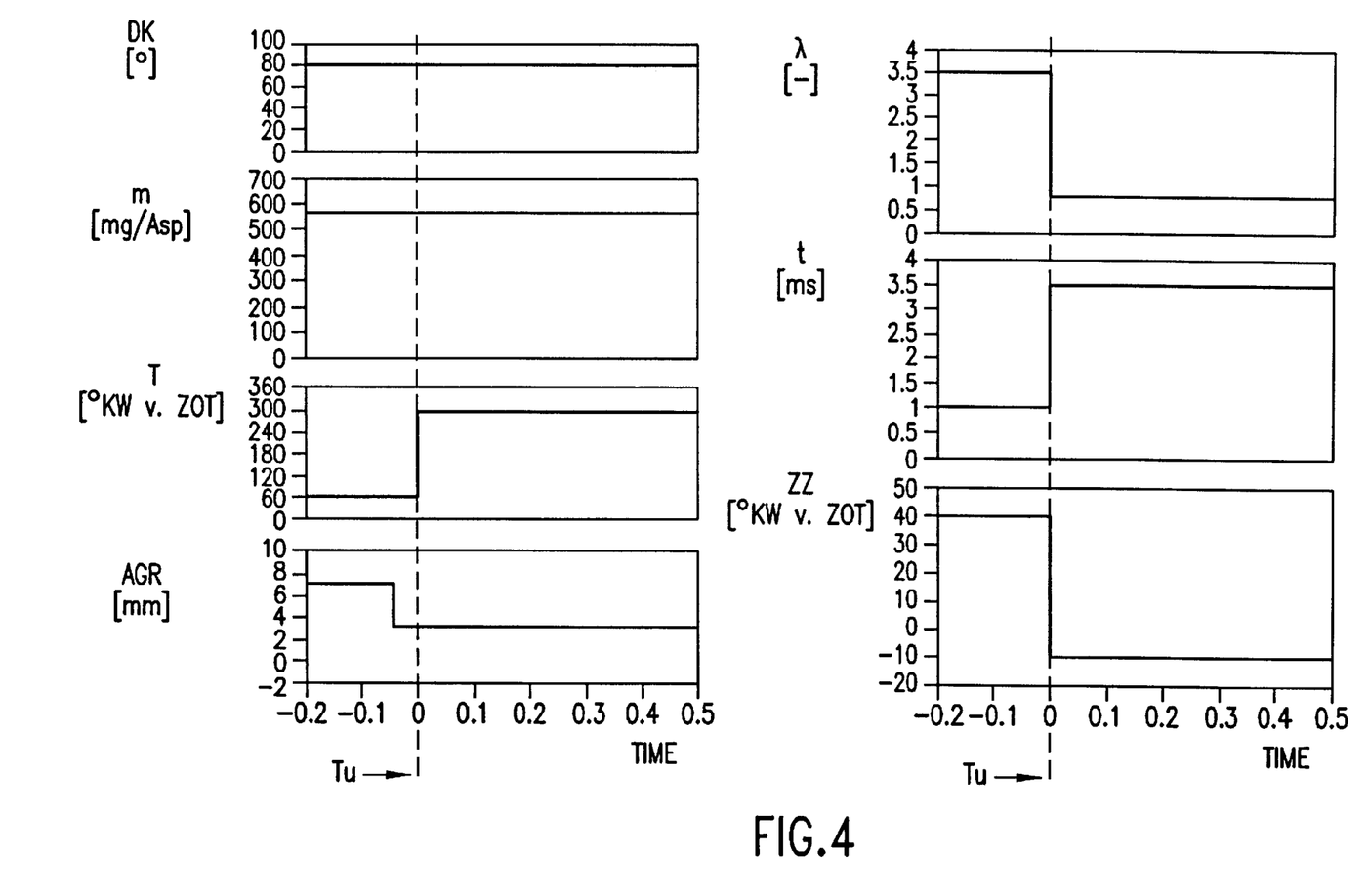
FIG. 4 are diagrams of parameter courses during a change of the operating mode to a homogeneous mixture formation in another embodiment of the method according to the invention.
Figure 5:
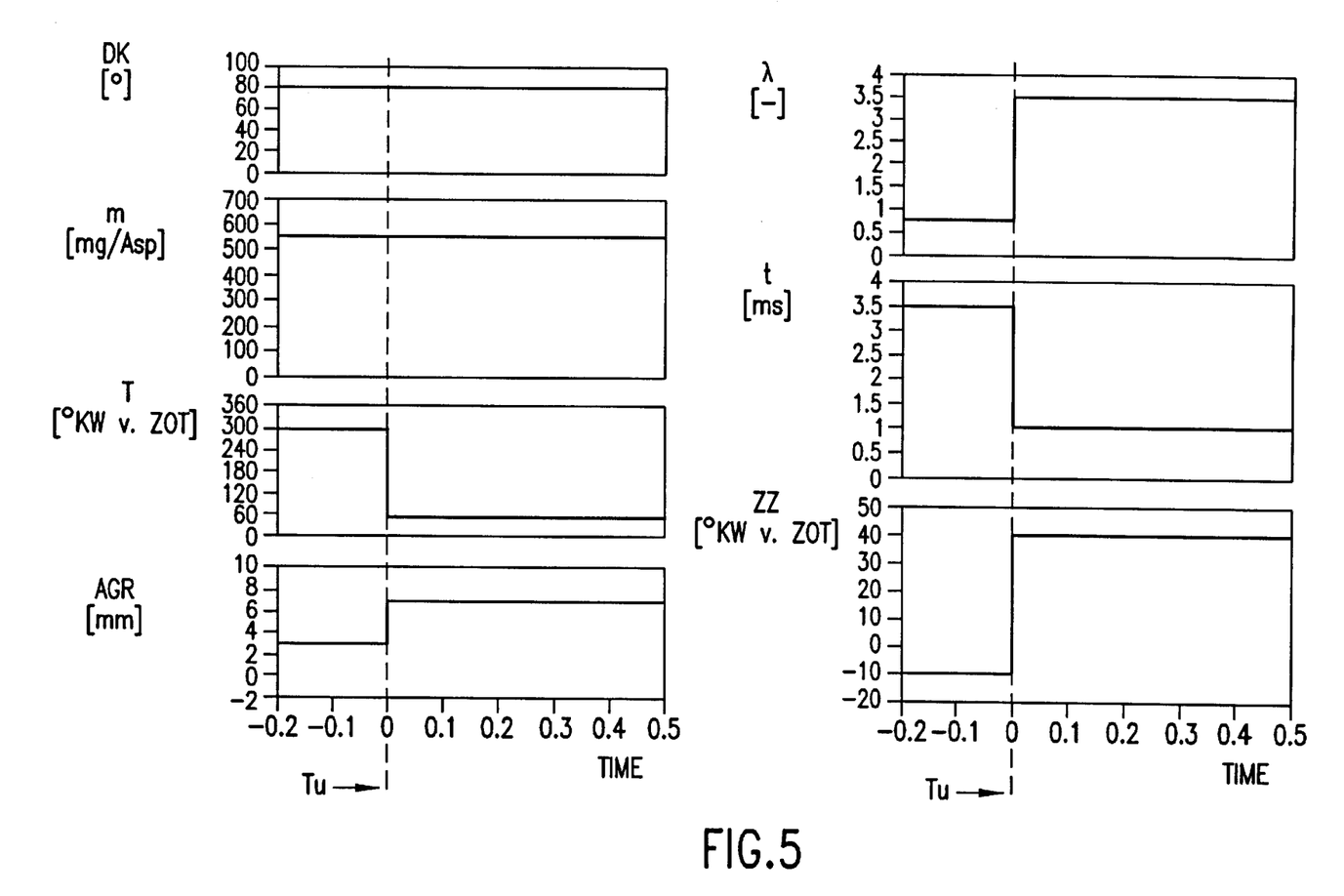
FIG. 5 are diagrams of the sequences of the parameter courses during a change to the stratified charge operation in the case of the method of FIG. 4.

FIGS. 4 and 5 indicate the parameter courses for another embodiment of the method for changing the operating mode which are particularly suitable for the regeneration of the storage catalyst during the stratified charge operation with a subsequent changing back to the charge stratification. The throttle valve DK is not operated for the regeneration of the storage catalyst with a temporarily homogeneous mixture formation. That is, also during the regeneration phase, the maximal cylinder filling mass m is present according to the stratified charge operation. As described above, the formation of the homogeneous fuel/air mixture is achieved by the shifting of the injection end T from the compression cycle into the intake cycle abruptly at the change-over point in time $T_u$. The injection time is changed corresponding to the intake air flow, which remains unchanged.

With the abrupt prolongation of the injection time t at the change-over point in time $T_u$, homogeneous mixture is formed with the same intake air flow as in the stratified charge operation and the correspondingly higher fuel quantity. Starting from the lean fuel/air ratio lambda of approximately 3.5 in the stratified charge operation, a change-over takes place without delay to the regeneration of the storage catalyst with rich mixtures and fuel/air ratios $\lambda \leq 1$. For the entire duration of the regeneration, the increased fuel quantity is injected in order to achieve the desired fuel/air ratio $\lambda < 1$.

Despite the no-delay change of the operating mode, during the sudden change-over of the injection parameters, the running performance of the internal-combustion engine is not influenced because, as the result of the proportional, i.e., in this case abrupt adjustment of the ignition point in time in the direction of a later ignition, the power output of the internal-combustion engine is kept constant. The increase of the engine torque, which is possible with the increased fuel injection quantity while the intake air flow is the same, is neutralized immediately by the displacement of the ignition point in time.

The exhaust gas recirculation rate is reduced during the regeneration phase of the storage catalyst. The exhaust gas recirculation valve is adjusted by the control unit before the change-over point in time $T_u$ in the direction of the closing position. Thereby, during the regeneration phase, a correspondingly lower exhaust gas recirculation rate is present. The desired-value curve for the lift of the exhaust gas recirculation valve is illustrated in FIG. 4 with the sequences of the processes for the change of the operating mode for regenerating the storage catalyst.

When a changing-back to the stratified charge operation takes place at the end of the regeneration phase corresponding to the parameter course of FIG. 5, the injection parameters injection end T and injection time t as well as the ignition point in time ZZ are abruptly adjusted at the change-over point in time $T_u$ to the steady-state values for the stratified charge operation. As a result, the fuel/air ratio lambda rises abruptly from the homogeneous mixture formation with rich fuel/air ratios below $\lambda=1$ to the lean stratified charge operation with $\lambda=3.5$.

The control of the exhaust gas recirculation rate always takes place by adjustment of the average cross-section of the AGR valve coupled with the position of the throttle valve. The suitable position of the throttle valve allows adjustment of the required pressure difference for achieving a higher or lower exhaust gas recirculation rate at the opened exhaust gas recirculation valve. In the illustrated alternate embodiment of the method without a change of the throttle valve position, after the conclusion of the regeneration of the storage catalyst and the changing-back to the stratified charge operation, the possible increase of the exhaust gas recirculation rate is achieved exclusively by the enlargement of the passage cross-section of the AGR valve. The lift of the AGR valve is raised abruptly at the change-over point in time $T_u$ to the stratified charge operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for changing an operating mode of a direct-injection Otto cycle internal-combustion engine between a stratified charge operation with a later fuel injection during a compression cycle and intake air supplied in an unthrottled manner, lean fuel/air mixture being formed with fuel/air ratios $\lambda > 1$, and an operating mode with a homogeneous mixture formation provided for higher load ranges of the internal-combustion engine by fuel injection during the intake cycle, comprising the steps of:

operating the internal-combustion engine, for periodic regeneration of an $NO_x$ storage catalyst for decontaminating exhaust gases of the internal-combustion engine flowing through at lean fuel/air ratios, with the homogeneous mixture formation and rich fuel/air ratios below the stoichiometric mixture ratio $\lambda = 1$;

at a change-over time, shifting the injection end of the fuel injection into a power cycle provided for a demanded operating mode;

during a homogeneous operating phase bounded by the change-over time, apportioning a fuel quantity to be injected per power cycle corresponding to an actual intake air flow by adjusting the respective injection time; and adjusting an ignition point time isochronously and proportionally with a change of injection time in a direction toward a later ignition.

2. The method according to claim 1, wherein the ignition point in time is determined according to a defined dependence on power of the internal-combustion engine to be delivered and on actual injection quantity.

3. The method according to claim 1, wherein during an exhaust gas recirculation operation of the internal-combustion engine, exhaust gas recirculation rate is reduced before the change-over point in time.

4. The method according to claim 3, wherein the ignition point in time is determined according to a defined dependence on power of the internal-combustion engine to be delivered and on actual injection quantity.

5. The method according to claim 3, wherein the reduction of the exhaust gas recirculation rate takes place no later than at the change-over point in time.

6. The method according to claim 3, wherein an exhaust gas recirculation valve is closed during the change of the operating mode and thereafter a provided steady-state value of the exhaust gas recirculation rate is set.

7. The method according to claim 6, wherein the reduction of the exhaust gas recirculation rate takes place no later than at the change-over point in time.

8. The method according to claim 1, wherein injection parameters comprising the injection time, an injection end, and the ignition point in time at the change-over point in time are adjusted abruptly to the steady-state values provided for regeneration of the $NO_x$ storage catalyst, whereby changing-back also takes place abruptly.

9. The method according to claim 1, wherein a throttling element acting upon the intake air flow, during a change to the homogeneous mixture formation, is adjusted toward a minimal flow rate and, during a change to the stratified charge operation, is adjusted in the opening position, the adjusting of the throttling element taking place before the change-over point in time.

10. The method according to claim 9, wherein during a change to the operating mode with the homogeneous mixture formation, the throttling element is moved before the change-over point in time into the closed position with a minimal flow rate.

11. The method according to claim 10, wherein after the change-over point in time, the throttling element is moved into a steady-state position assigned to the required intake air flow rate for the demanded load point of the internal-combustion engine during the homogeneous mixture formation.

12. The method according to claim 9, wherein a closing movement of the throttling element occurs in two steps.

13. The method according to claim 9, wherein the throttling of the intake air flow takes place by a variably adjustable valve timing of the charge cycle valves of the internal-combustion engine.

14. The method according to claim 1, wherein regeneration of the $NO_x$ storage catalyst takes place during every change to the operating mode with a homogeneous mixture formation.

* * * * *